US010793041B2

(12) United States Patent
Steinberger et al.

(10) Patent No.: US 10,793,041 B2
(45) Date of Patent: Oct. 6, 2020

(54) METHOD FOR PRODUCING AN ADJUSTING DEVICE FOR A VEHICLE SEAT, AND ADJUSTING DEVICE

(71) Applicant: Continental Automotive GmbH, Hannover (DE)

(72) Inventors: Johann Steinberger, Brunnen (DE); Franz Stadler, Langquaid (DE); Wolfgang Thiel, Denkendorf (DE); Markus Prexl, Bad Abbach (DE)

(73) Assignee: Continental Automotive GmbH (DE)

( * ) Notice: Subject to any disclaimer, the term of this patent is extended or adjusted under 35 U.S.C. 154(b) by 21 days.

(21) Appl. No.: 16/308,043

(22) PCT Filed: Jul. 11, 2017

(86) PCT No.: PCT/EP2017/067351
§ 371 (c)(1),
(2) Date: Dec. 7, 2018

(87) PCT Pub. No.: WO2018/011184
PCT Pub. Date: Jan. 18, 2018

(65) Prior Publication Data
US 2019/0255977 A1 Aug. 22, 2019

(30) Foreign Application Priority Data
Jul. 11, 2016 (DE) .................. 10 2016 212 606

(51) Int. Cl.
*A47C 3/00* (2006.01)
*B60N 2/90* (2018.01)
*B29L 31/00* (2006.01)

(52) U.S. Cl.
CPC ........ *B60N 2/914* (2018.02); *B29L 2031/771* (2013.01); *B60N 2/976* (2018.02)

(58) Field of Classification Search
CPC ... B60N 2/914; B60N 2/976; B29L 2031/771; A61H 9/0078; A61H 9/005; A61H 9/00;
(Continued)

(56) References Cited

U.S. PATENT DOCUMENTS 5,558,398 A * 9/1996 Santos ............... A47C 4/54
297/284.3
6,212,719 B1 * 4/2001 Thomas ............... A47C 4/54
297/284.6

(Continued)

FOREIGN PATENT DOCUMENTS

DE 102007051759 A1 5/2009
DE 102012201417 A1 4/2013
(Continued)

OTHER PUBLICATIONS

International Search Report and Written Opinion for International Application No. PCT/EP2017/067351, dated Oct. 10, 2017—9 pages.

(Continued)

*Primary Examiner* — Chi Q Nguyen
(74) *Attorney, Agent, or Firm* — RatnerPrestia

(57) ABSTRACT

A method for producing an adjusting device for a vehicle seat has the following steps. A flexible hollow body is molded from a thermoplastic plastic by injection molding, wherein the hollow body forms a pressure medium chamber and has an opening which is surrounded by a connecting portion. Furthermore, a first film is arranged at the opening. In particular, a pressure medium line is inserted between the connecting portion or the opening and the first film. Finally, the first film is connected to the hollow body at the connecting portion of the opening at the connecting seam in order to thereby close off the pressure medium chamber. Because the flexible hollow body is formed in one step, in particular by an injection molding process, the manufactur- (Continued)

ing complexity is minimized and the robustness of the hollow body is increased.

12 Claims, 6 Drawing Sheets

(58) Field of Classification Search
CPC .... A61H 2201/0103; A61H 2201/0149; A61H 2201/5071
USPC ......... 297/284.6, 284.4, 284.2, 284.3, 284.1, 297/DIG. 3, DIG. 8; 5/713; 383/3
See application file for complete search history.

(56) References Cited

U.S. PATENT DOCUMENTS

| | | | | |
|---|---|---|---|---|
| 6,551,450 | B1* | 4/2003 | Thomas | A61H 9/0078 156/580.1 |
| 6,916,300 | B2* | 7/2005 | Hester | A61H 23/04 297/284.6 |
| 8,162,398 | B2* | 4/2012 | Colja | A61H 9/0078 297/284.4 |
| 9,725,177 | B2* | 8/2017 | John | A47C 27/10 |
| 9,802,518 | B2* | 10/2017 | Steinberger | B60N 2/525 |
| 10,406,063 | B2* | 9/2019 | Mitchell | A61H 23/006 |
| 2006/0049678 | A1 | 3/2006 | Kern et al. | |
| 2006/0085919 | A1* | 4/2006 | Kramer | A47C 27/082 5/713 |
| 2006/0217644 | A1* | 9/2006 | Ozaki | A61H 9/0078 601/148 |
| 2008/0080793 | A1 | 4/2008 | Kitou | |
| 2010/0031449 | A1* | 2/2010 | Cheng | A61H 9/0078 5/713 |
| 2011/0203589 | A1* | 8/2011 | Fenton | A61M 16/0072 128/205.13 |
| 2015/0025425 | A1* | 1/2015 | Mitchell | A61H 1/008 601/96 |

FOREIGN PATENT DOCUMENTS

| | | |
|---|---|---|
| DE | 102013003674 A1 | 9/2014 |
| DE | 102014219343 A1 | 9/2015 |
| WO | 2004026623 A1 | 4/2004 |

OTHER PUBLICATIONS

German Examination Report for Application No. 10 2016 212 606.7, dated Apr. 5, 2017—5 pages.

* cited by examiner

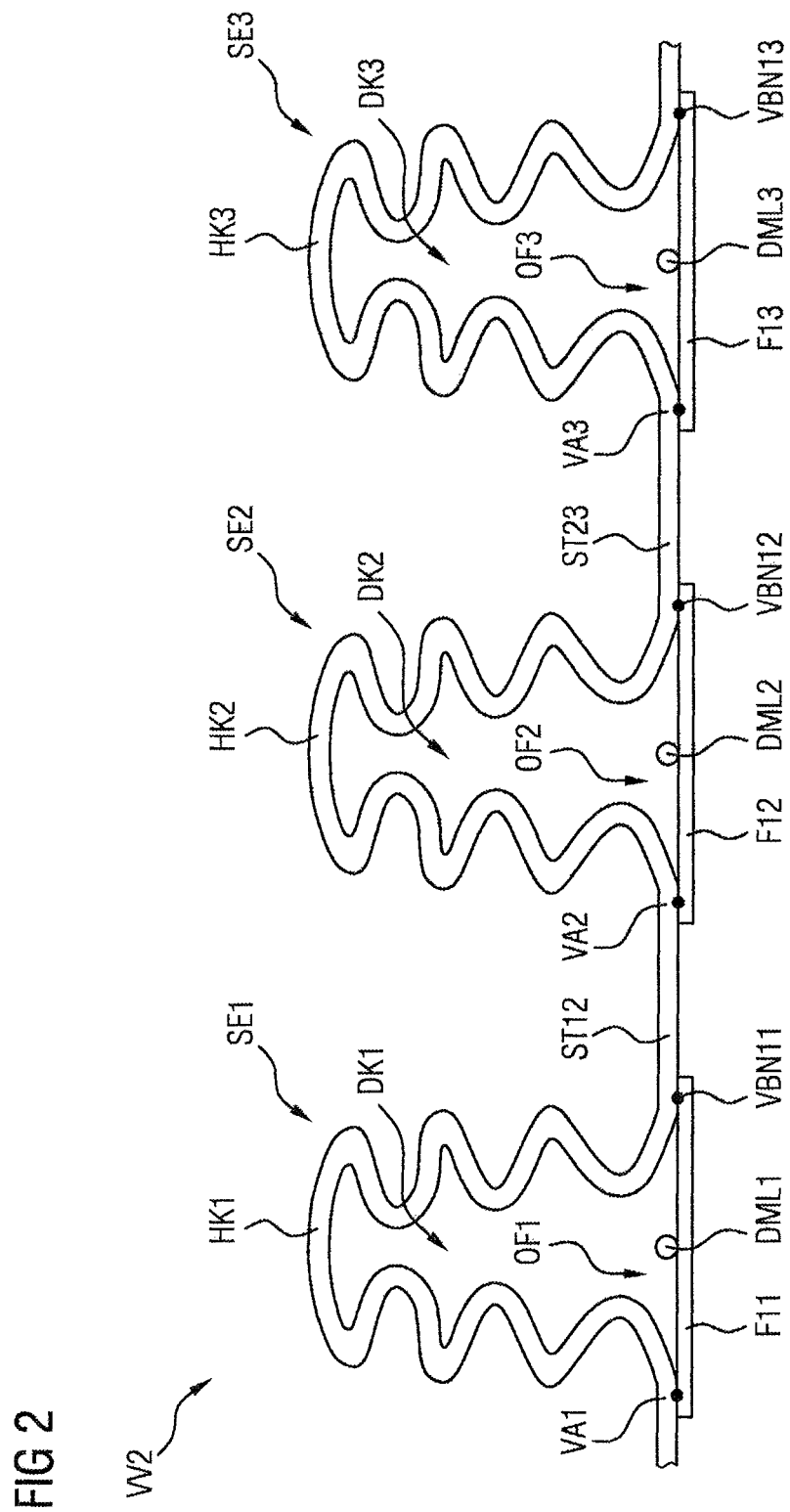

METHOD FOR PRODUCING AN ADJUSTING DEVICE FOR A VEHICLE SEAT, AND ADJUSTING DEVICE

CROSS REFERENCE TO RELATED APPLICATIONS

This application is the U.S. National Phase Application of PCT International Application No. PCT/EP2017/067351 filed Jul. 11, 2017, which claims priority to German Patent Application No. 10 2016 212 606.7, filed Jul. 11, 2016, the contents of such applications being incorporated by reference herein.

FIELD OF THE INVENTION

The present invention concerns a method for producing an adjusting device for a vehicle seat, in particular a pneumatic adjusting device for changing a contour of a seat bearing surface of the vehicle seat. Furthermore, the present invention concerns an adjustment device itself, in particular in the form of a pneumatic device for changing a contour of a seat bearing surface of a vehicle seat. The present invention also relates to a vehicle seat having an adjusting device of said type.

BACKGROUND OF THE INVENTION

In modern vehicle seats, bladders which can be filled with a pressure medium, in particular with a gaseous pressure medium such as compressed air, are situated as actuating elements in the region of the seat surface or backrest (together also referred to as the seat bearing surface), and can be supplied with pressure medium via a respective pressure medium line. By filling a respective bladder with pressure medium, its volume is increased so that the properties of a seat backrest or surface in relation to the contour can be changed. For filling the respective bladder with pressure medium, the pressure medium is firstly generated by a pressure medium source, for example by a compressor or a compressor unit, and guided via a corresponding valve, in particular an electropneumatic valve of a control unit, to a respective bladder.

It is conceivable that an arrangement described above may be produced from one or more bladders with respective assigned pressure medium lines. It is here conceivable that the respective bladders are produced from two or more flexible films, wherein the films are welded together at a connecting seam to form a respective bladder. If a bladder with for example three chambers is to be produced, two films must be welded accordingly three times in order to form three bladder chambers or pressure medium chambers, which then in a further method step are joined together to form a single bladder with three chambers. With a pneumatic adjusting device with a plurality of such three-chamber bladders in particular, the manufacturing process for producing such an adjusting device is very complex.

SUMMARY OF THE INVENTION

An aspect of the present invention aims to create a possibility of minimizing the manufacturing complexity for producing an adjusting device.

According to a first aspect of the invention, a method for producing an adjusting device, in particular for a vehicle seat, is made available. This may be a pneumatic device for changing a contour of a seat bearing surface of the vehicle seat. In a first step, a flexible hollow body is molded from a thermoplastic plastic, wherein the hollow body forms a pressure medium chamber and has an opening which is surrounded by a connecting portion. Furthermore, a first film, in particular a flexible plastic film, is arranged at the opening. Finally, the first film is connected to the hollow body at the connecting portion of the opening at a connecting seam in order to thereby close off the pressure medium chamber. Because the hollow body is now formed in one step, the manufacturing complexity can be reduced in comparison with production of a bladder from several film portions.

According to an aspect of the invention, the hollow body is produced by an injection molding process of the thermoplastic plastic. In this way, a hollow body, even with complex design, can be produced in a single method step and in a simple economic process, so that the manufacturing complexity is thereby further minimized. In particular, it is here conceivable that a one-piece (three-dimensional), flexible hollow body is created with great design freedom.

According to a further embodiment of the method, according to the invention, the flexible hollow body may be produced by a deep-drawing process from a second film, in particular a flexible plastic film (of a thermoplastic plastic). Thus again, the hollow body may be molded by a simple method in a single process step, so that the manufacturing complexity can be minimized. In particular, it is here conceivable that a one-piece (three-dimensional), flexible hollow body is created from the second film with great design freedom.

According to a further embodiment of the invention, the opening and the connecting portion surrounding this lie in one plane, so that a flat connecting seam is produced on connection to the first film. Firstly, a flat connecting seam is thus produced in a simple process and guarantees great stability.

According to a further embodiment of the hollow body itself, this may assume various shapes or geometries such as for example radii, surface structures and receivers. It is here possible that the hollow body has one or more chambers which may be filled with pressure medium and, in the case of several chambers, are connected together by a pressure medium channel. The greater the number of chambers, the greater the lift which the hollow body can exert when filled with pressure medium. It is furthermore conceivable that the hollow body has the shape of a bellows with one or more folds. In particular, the hollow body has two or more folds in order thus to generate a sufficiently great lift and hence produce a contour change of the seat bearing surface which is perceptible to an occupant or user of the vehicle seat. By forming the hollow body with one or more folds which are then opened or unfolded on filling with pressure medium and collapsed again on evacuation of the hollow body, a controlled lift of the hollow body can be ensured. Furthermore, the formation of folds in the hollow body improves the mechanical stability on raising and lowering (or filling and evacuating). Finally, it must be stated that in particular with an integrally formed injection-molded or deep-drawn hollow body, in particular with worked-in folds, due to the one-piece design the robustness and hence the quality is improved (due to the absence of weld seams between films for forming pressure medium chambers).

According to a further embodiment of the method, before connecting the first film to the hollow body, a pressure medium line, in particular in the form of a hose made of a plastic or rubber, for introducing pressure medium into the pressure medium chamber is inserted between the connecting portion and the first film. The pressure medium line may here be provided for the introduction of pressure medium and/or for the evacuation of pressure medium. Furthermore, it is also conceivable to provide a second pressure medium line between the connecting portion and the first film, wherein then one of the pressure medium lines may be used for the introduction of pressure medium and the other pressure medium line for the evacuation of pressure medium. By inserting the pressure medium line(s) between the connecting portion and the first film in advance, the hollow body may then be connected to the first film and additionally to the pressure medium line or lines via a connecting seam, so that a sealed pressure medium chamber is created in the hollow body which can only exchange pressure medium with the environment via the one or more pressure medium lines.

According to a further embodiment of the method, the first film (in particular on a side opposite the hollow body) is connected to a carrier film for holding the hollow body at a second connecting seam. It is here conceivable that not only the hollow body but also further hollow bodies are connected to the carrier film at further second connecting seams, in order thus to create an adjusting device with several hollow bodies as actuating elements which are held by the carrier film and hence can easily be installed in the vehicle seat.

On use of a carrier film, it is conceivable that this consists of a first and a second film layer which are arranged adjacent to each other, wherein by connecting the first and second film layers along a line-side connecting seam, a second pressure medium line is formed to create a pressure medium connection to the carrier film. This second pressure medium line may then also serve as a pressure medium connection to the pressure medium chamber of the hollow body.

While it has just been described that the carrier film consists of a first and a second film layer which may form a second pressure medium line by connection along a line-side connecting seam, it is also conceivable to develop this carrier film structure further. Consequently, it is conceivable, in the step of molding the flexible hollow body, to form the second film layer from a thermoplastic plastic with one or more flexible hollow bodies which are held together by portions of the second film layer. Accordingly, the first film layer of the carrier film may be used as the first film, which is connected to the second film layer so as to close off the respective hollow bodies at one or more line-side connecting seams between the two film layers and form one or more pressure medium lines, in order to supply the hollow body or bodies in the second film layer with pressure medium (or evacuate pressure medium therefrom). In this way, the film layers of the carrier film may not only perform the function of holding together actuating devices which can be filled with pressure medium, but in addition constitute pressure medium lines and also the actuating elements in the form of hollow bodies in the second film layer of the carrier film. In this way, an adjusting device is created with minimum complexity in terms of manufacturing and tooling.

In other words, it is conceivable that on use of a carrier film, the carrier film consists of a first and a second film layer which are arranged adjacent to each other, wherein the first film layer forms the first film described above, and the second film layer has the flexible hollow body, and wherein by connecting the first film layer to the second film layer along a line-side connecting seam, a (or a further) pressure medium line is formed in order to create a pressure medium connection to the pressure medium chamber of the flexible hollow body.

According to a further embodiment, it is also conceivable (without using a carrier film) that the step of molding furthermore comprises molding of at least one further flexible hollow body from a thermoplastic plastic with an opening which is surrounded by a connecting portion, wherein between the hollow body and the at least one further hollow body, a connecting web is formed or molded which holds the hollow bodies together. This means that here, to optimize material usage in the production of the hollow body, the connecting webs already hold the hollow bodies together so they do not have to be mounted on a separate carrier film (for example welded) to guarantee being held together for mounting. The hollow bodies may then be closed off again by corresponding first films.

According to a further embodiment, the first, second and line-side connecting seams are weld seams, or these connecting seams are produced by welding, in particular highfrequency welding. This constitutes a favourable joining method which gives the adjusting device great robustness.

According to a further embodiment of the method, on molding of the hollow body at least one lift-limiting element may be formed or molded which prevents an expansion of the hollow body beyond a predefined extent during filling. In particular, the at least one lift-limiting element may be molded on the outside of the hollow body. The at least one lift-limiting element may be a strap-like structure with a specific length which, in particular in a hollow body with a fold (bellows) structure, is attached between the folds. When the hollow body expands and hence when the folds move apart, the strap-like structure is thus stretched to the specific length and then stops the folds from moving further apart.

Another aspect of the present invention provides an adjusting device in particular for a vehicle seat. This may be a pneumatic device for changing a contour of a seat bearing surface of the vehicle seat. This adjusting device has a flexible hollow body molded from a thermoplastic plastic, which forms a pressure medium chamber and has an opening which is surrounded by a connecting portion. Furthermore, it has a first film which is connected to the hollow body at the connecting portion of the opening at a connecting seam in order to thereby close off the pressure medium chamber.

According to an aspect of the invention, the flexible hollow body is produced by an injection molding process of the thermoplastic plastic. In this way, the hollow body for forming the pressure medium chambers is produced using simple processes with little manufacturing complexity, and may have almost any arbitrarily complex design with one or more pressure medium (part) chambers or for example have the form of a bellows.

According to one embodiment of the adjusting device, a pressure medium line for the introduction (and where applicable evacuation) of pressure medium into the pressure medium chamber is inserted at the connecting seam between the first film and the connecting portion of the hollow body. It is also conceivable that several pressure medium lines may be inserted which may then be connected by the connecting seam to the other components, the hollow body and the first film, in order to create a sealed pressure medium chamber in the hollow body which can only exchange pressure medium via the pressure medium line(s).

According to a further aspect of the invention, a vehicle seat is created which has a seat bearing surface for a user. Also, the vehicle seat comprises an adjusting device according to one of the embodiments described above, which is arranged in the vehicle seat so as to change the contour of the seat bearing surface.

Advantageous configurations of the method may, insofar as applicable to the adjusting device and the vehicle seat, also be regarded as advantageous configurations of the adjusting device and the vehicle seat, and vice versa.

BRIEF DESCRIPTION OF THE DRAWINGS

Exemplary embodiments of the invention will now be explained in more detail below with reference to the accompanying drawings. The drawings show:

FIG. 2 a diagrammatic depiction of an adjusting device according to a second embodiment of the invention;

DETAILED DESCRIPTION OF THE PREFERRED EMBODIMENTS

Figure 1A:
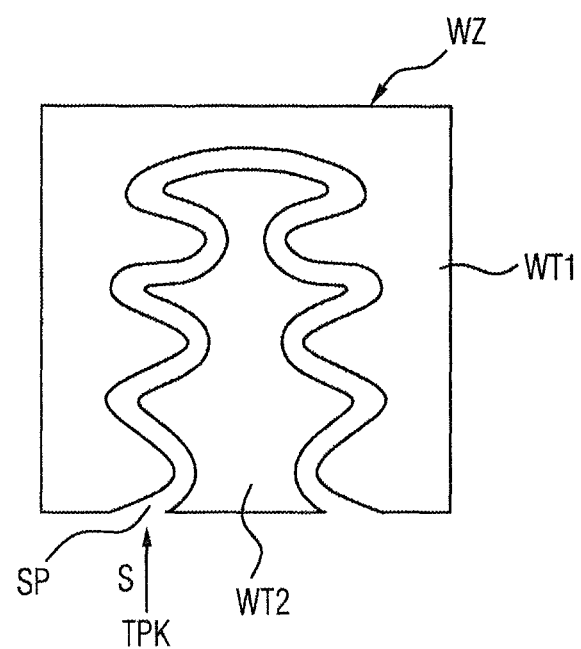
FIGS. 1A-1E a diagrammatic depiction of a method for producing an adjusting device for a vehicle seat according to a first embodiment of the invention.

Reference is first made to FIGS. 1A-1E, which shows diagrammatically the sequence of a method for producing an adjusting device for a vehicle seat, in particular a pneumatic adjusting device for changing a contour of a seat bearing surface of the vehicle seat. In a first step, according to the depiction of FIG. 1A, a tool WZ is provided which in the diagrammatic depiction here consists of two tool parts WT1 and WT2. The tool parts WT1 and WT2 are arranged or oriented relative to each other such that a gap SP is created between them. This gap is dimensioned and designed such that it corresponds to a hollow body which can be produced in an injection molding process using the tool WZ. As the lower portion of FIG. 1A shows, for this a heated and liquefied thermoplastic plastic (such as TPU=thermoplastic polyurethane) is injected under pressure into the left opening of the gap SP following arrow S. In the tool WZ, the thermoplastic plastic then reverts to a solid state by cooling or by a cross-linking reaction and thus assumes the shape of the gap SP formed between the tool parts WT1 and WT2.

Figure 1B:
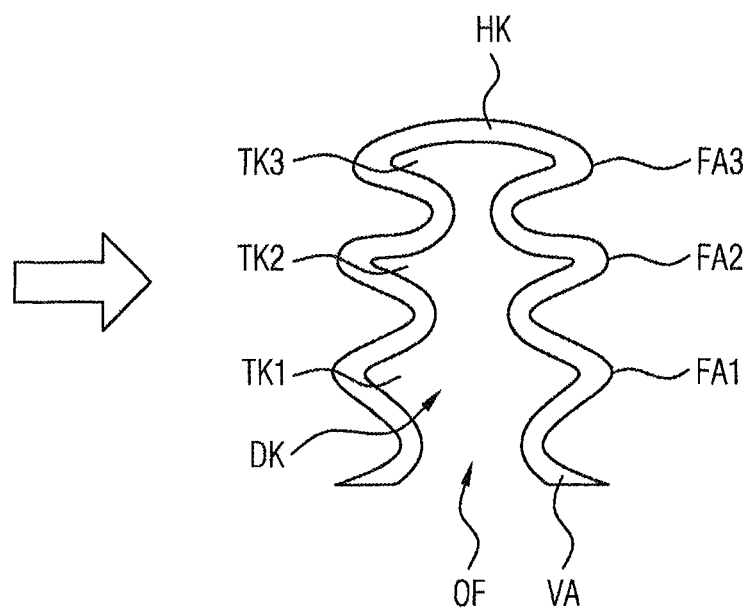

When the thermoplastic plastic is then in the solid state (as an injection-molding), in a second step it can be removed as a finished component by opening the tool, giving a hollow body HK as shown in FIG. 1B. This hollow body of flexible form substantially has the shape of a bellows closed at one end (the upper end) with three outwardly directed folds FA1, FA2, FA3. Three part chambers TK1, TK2 and TK3 are formed in the region of the three folds and together form a pressure medium chamber DK. As FIG. 1B shows, at the lower end the hollow body HK has an opening OF which is surrounded by a connecting portion VA.

Figure 1C:
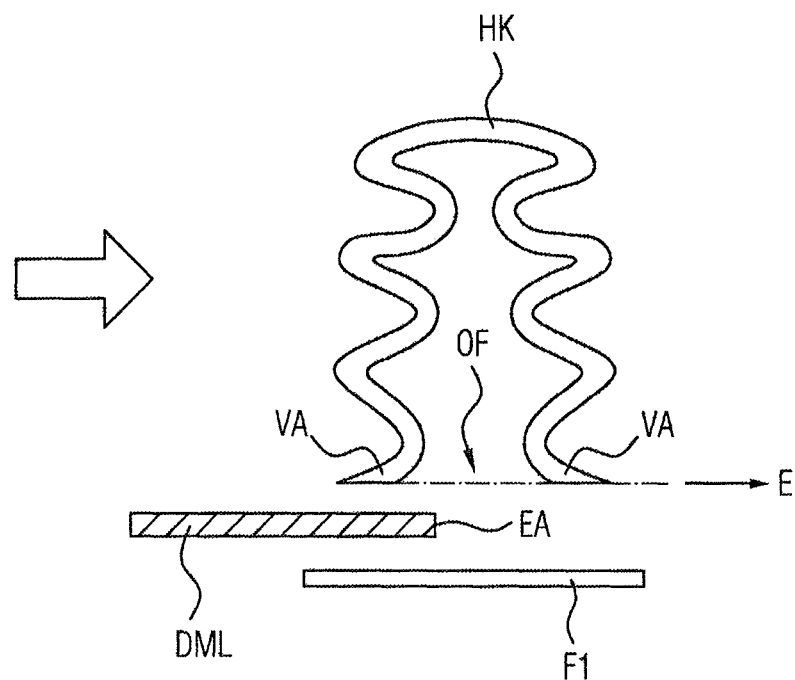

In a third step, the pressure medium chamber DK must now be sealed tightly (against pressure medium). However, pressure medium must be introduced into the pressure medium chamber in order to fill this and achieve a lift or expansion upward in the image plane. To this end, as shown in FIG. 1C, a pressure medium line DML is arranged at the opening OF of the hollow body such that an end portion EA of the pressure medium line DML is situated in the region of the opening OF. Furthermore, a first flexible film F1 is also arranged in the region of the connecting portion VA, so that the pressure medium line DML is situated between the first film and the connecting portion.

Figure 1D:
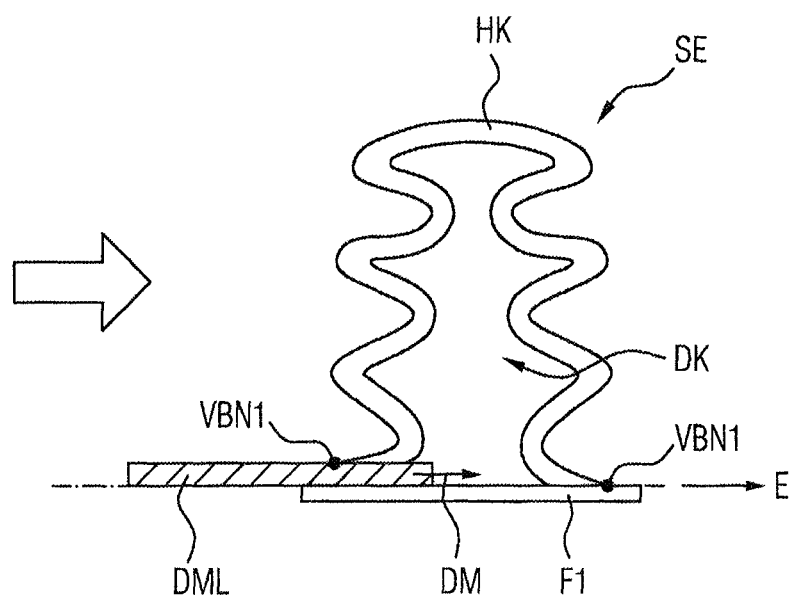

In a fourth step, as shown in FIG. 1D, the connecting portion VA of the hollow body is now connected to the first film F1 and to the pressure medium line DML along a connecting seam VBN1. This gives a sealed pressure medium chamber DK, wherein pressure medium DM can be introduced into or evacuated from the pressure medium chamber DK only via the pressure medium line DML. As FIG. 1C shows, the connecting portion VA terminates in a plane E so that the film F1 can be connected easily and precisely to the connecting portion VA along the connecting seam VBN1. This connection preferably takes place via a welding process, in particular a high-frequency welding process.

Figure 1E:
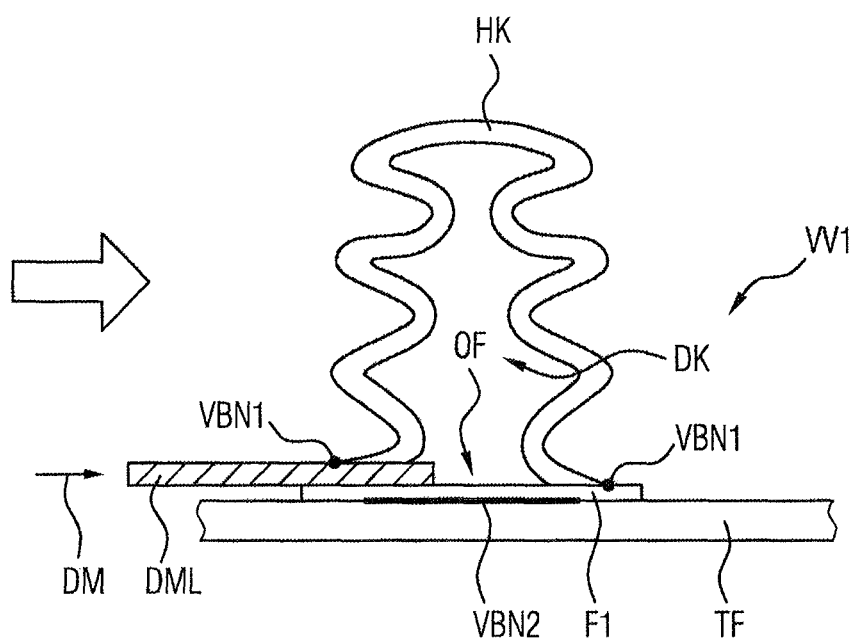

Up to FIG. 1D, it has been shown how a single actuating element SE can be produced in the form of the hollow body HK with the pressure medium chamber DK which can be filled with pressure medium. For installation of this actuating element SE, it may be advantageous to apply this to a carrier film. This is carried out in a fifth step as shown in FIG. 1E. To produce an adjusting device VV1 which can be mounted on a vehicle seat, the actuating element SE of FIG. 1D is applied to a carrier film TF via a second connecting seam VBN2. This connection by means of the second connecting seam VBN2 may again be a welding process, e.g. a high-frequency welding process. The carrier film may then comprise special contours or holders etc. which allow simple installation on the vehicle seat.

As will be evident from the following figures, it is now conceivable that not only is an actuating element SE installed in the vehicle seat as part of an adjusting device for changing the contour of the seat bearing surface for a vehicle seat, but two or more actuating elements SE may also be installed. It is therefore conceivable that several actuating elements SE, produced as shown up to step 4 in FIG. 1D, may be applied to the carrier film TF and connected by a respective second connecting seam VBN2. In this way, an adjusting device can be achieved with a wide range of actuating possibilities for changing the contour of the seat bearing surface of the vehicle seat.

Reference is now made to FIG. 2, which shows a second embodiment of an adjusting device VV2. In principle, to produce the respective hollow bodies HK1, HK2 and HK3 (with pressure medium chambers DK1, DK2, DK3) of the adjusting device VV2, the production steps used are similar to those shown in FIGS. 1A-1D. The difference for the second embodiment of the adjusting device VV2 is that to produce the hollow bodies HK1, HK2 and HK3, use is not made of separate tools as shown in FIGS. 1A and 1B, but here a common tool is used for producing the three hollow bodies, wherein in this tool furthermore a gap is formed for filling with thermoplastic plastic which additionally forms the webs ST12 and ST23. Web ST12 connects together the hollow bodies HK1 and HK2, while web ST23 connects together the hollow bodies HK2 and HK3. It is naturally conceivable that further hollow bodies may be formed which are then connected to other hollow bodies via further webs. Then both pressure medium lines DML1, DML2 and DML3, and first films F11, F12, F13 are arranged at the respective openings OF1, OF2, OF3 or the connecting portions VA1, VA2 and VA3 surrounding these, as shown in step 3 in FIG. 1C, wherein these elements are then joined together by respective connecting seams VBN11, VBN12 and VBN13, as shown in the fourth step in FIG. 1D (in particular by welding or high-frequency welding).

The advantage of the adjusting device according to FIG. 2 is now that the individual hollow bodies HK1, HK2 and HK3 or the resulting actuating elements SE1, SE2 and SE3 are joined together by the respective webs ST12, ST23 etc., in order then to be installed as the actuating device VV2 on a vehicle seat. Forming the webs between the hollow bodies or actuating elements then means that no additional carrier film TF is required, so the complexity of tooling and manufacturing can be reduced.

Figure 3:
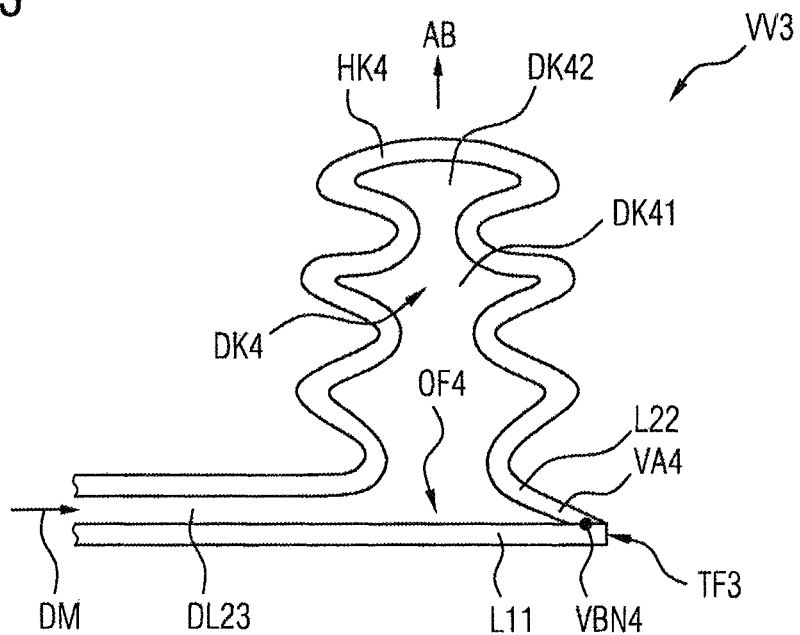
FIG. 3 a diagrammatic depiction of an adjusting device for a vehicle seat according to a third embodiment.

Reference is now made to FIG. 3, which shows an adjusting device VV3 according to a third embodiment of the invention. Again, explicitly a carrier film TF3 is used, wherein the individual film layers of the carrier film perform several functions.

As shown in FIG. 3, the carrier film TF3 comprises two film layers L11 and L22 which have a connecting seam VBN4 at various points or lines, in order thereby to form pressure medium lines such as a pressure medium line DL23 between the film layers L11 and L22. This formation of pressure medium lines between the film layers thus constitutes a further function of the film layer or carrier film.

A further function or property of the carrier film TF3 is that the second film layer L22 has already been produced with a special structure or special profile. More precisely, the film layer L22 has been produced by an injection molding process from a thermoplastic plastic material such as TPU. In other words, it is conceivable that the second film layer L22 has been produced using an injection molding process, as shown in FIGS. 1A and 1B, so that the second film layer L22 now comprises a hollow body HK4 with a pressure medium chamber DK4 (shown in FIG. 4 as pressure medium chambers DK41, DK42) situated therein. Pressure medium DM, which flows through the pressure medium line DL23, can finally flow into the pressure medium chamber DK4 through an opening OF4 of the hollow body HK4. In this way, the pressure medium chamber DK4 is filled with pressure medium and expands upward in the image plane along arrow AB and hence generates a lift in the direction of arrow AB. When installed correspondingly in the vehicle seat, this lift creates a force which acts on the seat bearing surface in order to change its contour.

The film L11 may then be regarded as the first film in FIG. 1, since this closes off the pressure medium chamber DK4 and pressure medium can be exchanged with the environment only via the pressure medium line DL23.

Figure 4:
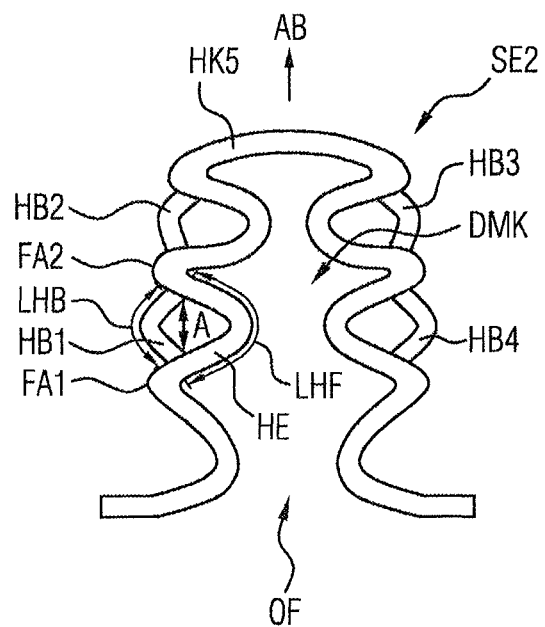
FIG. 4 a hollow body for an adjusting device for a vehicle seat according to one embodiment of the invention with a lift-limiting device.

Reference is now made to FIG. 4, which shows a further embodiment of a hollow body HK5. The particular feature of this hollow body HK5 (having pressure medium chamber DMK), which was produced following the steps in FIGS. 1A and 1B, is that this hollow body HK5 comprises lift-limiting elements HB1-HB4 on the outside. These lift-limiting elements are arranged between two folds and in particular in the vicinity of the (outwardly directed) fold tips. For example, the lift-limiting element HB1 is arranged between the folds FA1 and FA2. This lift-limiting element HB1 has a length LHB which is shorter than the length LHF of the hollow body depression HE. This means that if the hollow body HK expands in the direction of arrow AB due to the supply of pressure medium, at a specific expansion it reaches the state in which the lift-limiting elements HB1-HB4 are in the fully tensioned state, so that the folds or depressions (FA1, FA2, HE) cannot expand further along arrow A. In this way, the lift of the hollow body HK5 is limited, which leads to a reduction in the mechanical load on a hollow body.

Figure 5:
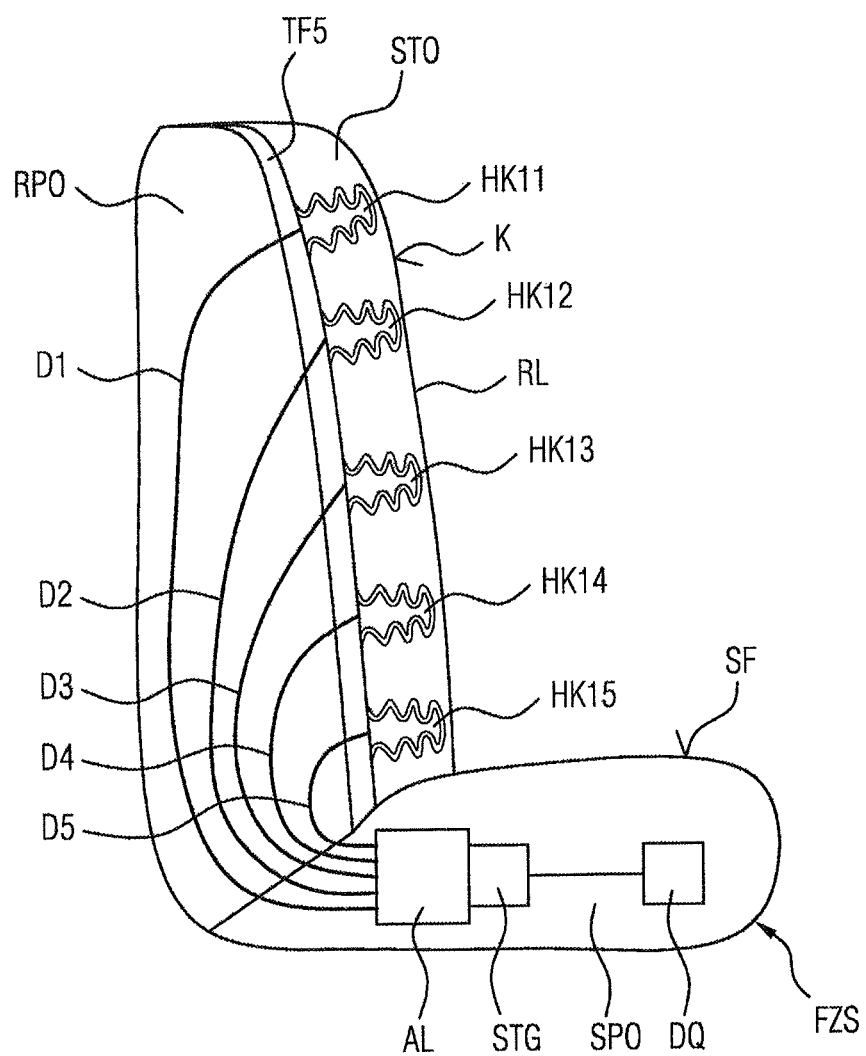
FIG. 5 a diagrammatic depiction of a vehicle seat according to one embodiment of the invention, in which a carrier film with a plurality of hollow bodies, as actuating elements for influencing the contour of the seat bearing surface of the vehicle seat, is arranged in the seat bearing surface in the region of the backrest.

Reference is now made to FIG. 5 which shows a vehicle seat FZS. This vehicle seat comprises a seat cushion SPO and a backrest cushion RPO. Here a seat surface SF on the seat cushion SPO and a backrest RL on the backrest cushion RPO each form a portion of a seat bearing surface of the vehicle seat FZS. A carrier film TF5 is applied to the part of the seat bearing surface formed by the backrest RL. The adjusting device constructed on the basis of the carrier film TF5 substantially corresponds to the adjusting device VV1 of FIG. 1E, with the difference that here, instead of one hollow body, five hollow bodies HK11, HK12, HK13, HK14 and HK15 are arranged on the carrier film to form respective actuating elements. It is however also conceivable to arrange more or fewer actuating elements on the carrier film TF5. It is furthermore conceivable that adjusting devices similar in structure to the adjusting devices VV2 and VV3 may be arranged on the vehicle seat.

A cover STO, composed for example of cloth or leather, may be provided over the hollow bodies HK11-HK15 and form the contour K of the backrest RL, which can be influenced by the hollow bodies HK11-HK15.

The hollow bodies HK11-HK15 or the pressure medium chambers formed therein are again connected to corresponding pressure medium lines D1-D5, which can finally be connected to an adapter element AL of a control unit STG. The control unit STG serves to provide pressure medium such as air, which is provided via a pressure medium source DQ, to the hollow bodies HK11-HK15 selectively via the pressure medium lines D1-D5, in particular via electropneumatic valves, in particular for a massage function.

By producing the hollow bodies with one or more pressure medium (part) chambers, in a single method step such as by injection molding or possibly by a deep-drawing process, pneumatic adjusting devices for a vehicle seat can be produced with little complexity in terms of manufacturing and tooling, and with high robustness.

The invention claimed is:

1. A method for producing an adjusting device for a vehicle seat comprising:
   molding of a flexible hollow body from a thermoplastic plastic, wherein the hollow body forms a pressure medium chamber and has an opening surrounded by a connecting portion;
   arranging a film at the opening; and
   connecting the film to the flexible hollow body at the connecting portion of the opening at a connecting seam in order to thereby close off the pressure medium chamber, wherein the flexible hollow body is formed by injection molding of the thermoplastic plastic.

2. The method as claimed in claim 1, wherein the opening and the connecting portion surrounding this lie in one plane so that a flat connecting seam is produced on connection to the film.

3. The method as claimed in claim 1, wherein the flexible hollow body is formed as a bellows.

4. The method as claimed in claim 1, wherein before connection of the film to the flexible hollow body, a pressure medium line for introduction of pressure medium into the pressure medium chamber is inserted between the connecting portion and the film.

5. The method as claimed in claim 1, wherein the step of molding furthermore comprises a molding of at least one further flexible hollow body from a thermoplastic plastic with an opening surrounded by a connecting portion, wherein a connecting web is formed between the hollow body and the at least one further hollow body and holds the hollow bodies.

6. The method as claimed in claim 1, wherein during molding of the flexible hollow body, at least one lift-limiting element is molded which prevents an expansion of the hollow body beyond a predefined extent when filling with pressure medium.

7. A method for producing an adjusting device for a vehicle seat comprising:
- molding of a flexible hollow body from a thermoplastic plastic, wherein the hollow body forms a pressure medium chamber and has an opening surrounded by a connecting portion;
- arranging a film at the opening; and
- connecting the film to the flexible hollow body at the connecting portion of the opening at a first connecting seam in order to thereby close off the pressure medium chamber, wherein the flexible hollow body is formed by injection molding of the thermoplastic plastic,
- wherein the film is connected to a carrier film for holding the flexible hollow body at a second connecting seam.

8. The method as claimed in claim 7, wherein the carrier film comprises a first film layer and a second film layer which are arranged adjacent to each other, wherein by connecting the first and second film layers along a line-side connecting seam, a second pressure medium line is formed in order to create a pressure medium connection to the pressure medium chamber of the flexible hollow body.

9. The method as claimed in claim 7, wherein the first, second or line-side connecting seam is produced by welding.

10. An adjusting device for a vehicle seat, comprising:
- a flexible hollow body molded from a thermoplastic plastic, which forms a pressure medium chamber and has an opening surrounded by a connecting portion;
- a film which is connected to the hollow body at the connecting portion of the opening at a connecting seam in order to thereby close off the pressure medium chamber, wherein the flexible hollow body is formed by injection molding from the thermoplastic plastic.

11. The adjusting device as claimed in claim 10, wherein a pressure medium line for introduction of pressure medium into the pressure medium chamber is inserted at the connecting seam between the film and the connecting portion.

12. A vehicle seat comprising:
- a seat bearing surface for a user; and
- the adjusting device as claimed in claim 10, which is arranged in the vehicle seat so as to change a contour of the seat bearing surface.

* * * * *